US010965828B2

(12) United States Patent
Okuzono

(10) Patent No.: US 10,965,828 B2
(45) Date of Patent: Mar. 30, 2021

(54) IMAGE FORMING APPARATUS

(71) Applicant: BROTHER KOGYO KABUSHIKI KAISHA, Nagoya (JP)

(72) Inventor: Taisei Okuzono, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/831,927

(22) Filed: Mar. 27, 2020

(65) Prior Publication Data

US 2020/0314278 A1    Oct. 1, 2020

(30) Foreign Application Priority Data

Mar. 28, 2019   (JP) .............................. JP2019-062854

(51) Int. Cl.
*H04N 1/00*          (2006.01)
(52) U.S. Cl.
CPC ..... *H04N 1/00811* (2013.01); *H04N 1/00822* (2013.01); *H04N 1/00824* (2013.01); *H04N 1/00832* (2013.01)
(58) Field of Classification Search
None
See application file for complete search history.

(56) References Cited

U.S. PATENT DOCUMENTS

| 6,604,806 | B1* | 8/2003 | Yamada | B41J 2/2132 |
| | | | | 347/15 |
| 8,437,032 | B2* | 5/2013 | Kakigi | H04N 1/1933 |
| | | | | 358/1.2 |
| 9,019,575 | B2* | 4/2015 | Suzuki | H04N 1/02815 |
| | | | | 358/475 |
| 2005/0168763 | A1* | 8/2005 | Higuchi | H04N 1/00453 |
| | | | | 358/1.13 |
| 2006/0269342 | A1* | 11/2006 | Yoshida | H04N 1/128 |
| | | | | 400/62 |
| 2007/0024902 | A1* | 2/2007 | Kato | G06F 3/128 |
| | | | | 358/1.15 |
| 2007/0035760 | A1* | 2/2007 | Hachiro | H04N 1/00801 |
| | | | | 358/1.13 |

(Continued)

FOREIGN PATENT DOCUMENTS

JP        H09200416 A      7/1997

*Primary Examiner* — Anh-Vinh T Nguyen
(74) *Attorney, Agent, or Firm* — Scully, Scott, Murphy & Presser, PC

(57) ABSTRACT

An image forming apparatus includes: a signal output unit configured to output a signal in response to a user operation; a reading unit configured to read a document and generate image data having a first resolution or a second resolution lower than the first resolution; a recording unit configured to form an image on a recording medium; and a controller configured to control the reading unit and the recording unit and execute: (a) primary preparation operation start processing of, when a signal is output, controlling the reading unit so as to start a first preparation operation or a second preparation operation; (b) determination processing of determining; (c) secondary preparation operation start processing and/or reading processing; (d) decision processing of deciding the continuous number of recording copies; and (e) recording processing of causing the recording unit to form the image on the recording medium.

8 Claims, 11 Drawing Sheets

(56) References Cited

U.S. PATENT DOCUMENTS

| | | | |
|---|---|---|---|
| 2007/0188806 A1* | 8/2007 | Maeda | H04N 1/32448 358/1.16 |
| 2008/0080001 A1* | 4/2008 | Yamada | G06F 3/128 358/1.15 |
| 2008/0180714 A1* | 7/2008 | Ishikawa | H04N 1/0097 358/1.13 |
| 2008/0192272 A1* | 8/2008 | Yamada | H04N 1/4078 358/1.9 |
| 2011/0019227 A1* | 1/2011 | Mizumukai | H04N 1/0035 358/1.15 |
| 2011/0194153 A1* | 8/2011 | Takahata | H04N 1/444 358/442 |
| 2014/0240774 A1* | 8/2014 | Suzuki | G06F 3/1292 358/1.15 |
| 2015/0092208 A1* | 4/2015 | Adachi | G06F 3/1225 358/1.13 |
| 2015/0343820 A1* | 12/2015 | Sasayama | B41J 2/2146 347/19 |

* cited by examiner

IMAGE FORMING APPARATUS

CROSS-REFERENCE TO RELATED APPLICATIONS

This application is based upon and claims the benefit of priority from prior Japanese patent application No. 2019-062854, filed on Mar. 28, 2019, the entire contents of which are incorporated herein by reference.

TECHNICAL FIELD

The present disclosure relates to an image forming apparatus including a document reading unit.

BACKGROUND

A known copier has a ten-key board for designating a number of copies. In the copier, after a number of copies is set with the ten-key board, if the number of copies is one copy, image data read with an image reading unit is directly sent to a printer unit from an image data controller via a printer interface unit. Also, if the number of copies is multiple copies, the image data read with the image reading unit is once stored in a page memory from the image data controller, and an operation of sending the image data from the page memory to the printer unit is repeated by the number of copies. By doing so, even when the number of copies is multiple copies, reading in the image reading unit, image processing in an image processing unit, and transfer of the image data from the image data controller are performed just once, so that it is possible to shorten a time required for copy.

When performing the copy processing by using the above-described copier, in a case of one copy, the reading can be performed at high resolution. However, in a case of multiple copies, the reading should be performed at low resolution, in some cases, due to memory capacity limits in a device. Due to a difference in reading resolution, adjustment and correction processing (preparation operation) relating to the reading processing, which is performed before the reading, should be set different between the cases of one copy and multiple copies.

In recent years, an image forming apparatus having a document reading unit, such as an inkjet printer, is sold without a ten-key board and a touch panel, considering the manufacturing cost. In the image forming apparatus, in order to designate the number of copies, it is considered for a user to press a specific key such as a print start key as many times as the desired number of copies. In this case, for example, the number of copies is fixed when a predetermined time has elapsed since the last pressing of the specific key. However, when the image forming apparatus adopts the technology of the above-described copier and performs the copy processing, the number of copies is fixed from the first pressing of the specific key, so that it takes a long time to start the adjustment and correction processing to be performed before the reading. As a result, the time required to complete the copy also increases correspondingly. Also in the image forming apparatus with the ten-key board and the touch panel, a certain amount of time is required to fix the number of copies, so that the similar problems occur.

SUMMARY

An object of the present disclosure to provide an image forming apparatus capable of shortening a time required to complete recording when reading resolution is varied depending on the number of recording copies.

An image forming apparatus according to the present disclosure includes: a signal output unit configured to output a signal in response to a user operation; a reading unit configured to read a document and generate image data having a first resolution or a second resolution lower than the first resolution; a recording unit configured to form an image on a recording medium; and a controller configured to control the reading unit and the recording unit. The controller is configured to execute:

(a) primary preparation operation start processing of, when the signal is output from the signal output unit, controlling the reading unit so as to start:

a first preparation operation of acquiring a first control parameter used for reading the document in a high resolution reading mode corresponding to the first resolution; or a second preparation operation of acquiring a second control parameter used for reading the document in a low resolution reading mode corresponding to the second resolution, (b) determination processing of determining whether a continuous number of recording copies to be performed by the recording unit is smaller than a predetermined number of copies or equal to or greater than the predetermined number of copies, based on a signal pattern output from the signal output unit, after the first preparation operation or the second preparation operation is started in the primary preparation operation start processing;

any one of processing of following (c1) to (c4):

(c1) reading processing of causing the reading unit to read the document in the high resolution reading mode in which the first control parameter acquired by the first preparation operation is used and generating the image data, in a case where the first preparation operation is started in the primary preparation operation start processing and the number of recording copies is determined to be smaller than the predetermined number of copies in the determination processing;

(c2) secondary preparation operation start processing of controlling the reading unit so as to start the second preparation operation, and reading processing of causing the reading unit to read the document in the low resolution reading mode in which the second control parameter acquired by the second preparation operation is used and generating the image data, in a case where the first preparation operation is started in the primary preparation operation start processing and the number of recording copies is determined to be equal to or greater than the predetermined number of copies in the determination processing;

(c3) reading processing of causing the reading unit to read the document in the low resolution reading mode in which the second control parameter acquired by the second preparation operation is used and generating the image data, in a case where the second preparation operation is started in the primary preparation operation start processing and the number of recording copies is determined to be equal to or greater than the predetermined number of copies in the determination processing; and (c4) secondary preparation operation start processing of controlling the reading unit so as to start the first preparation operation, and reading processing of causing the reading unit to read the document in the high resolution reading mode in which the first control parameter acquired by the first preparation operation is used and generating the image data, in a case where the second preparation operation is started in the primary preparation operation start processing and the number of recording copies is determined to be smaller than the predetermined number of copies in the determination processing, (d) decision processing of deciding the continuous number of recording copies to be performed by the recording unit, based on the signal pattern output from the signal output unit; and (e) recording processing of causing the recording unit to form the image on the recording medium of which the number of recording copies is decided in the decision processing, based on the image data generated in the reading processing.

Since one of the two preparation operations is started before the number of recording copies is fixed, it is possible to shorten the time required to complete the recording when the number of recording copies is suitable for the primary preparation operation (the preparation operation started in (a)). Also, even when the number of recording copies is not suitable for the primary preparation operation, the time required to complete the recording is not lengthened, as compared to the related art.

DETAILED DESCRIPTION

[Overall Configuration of Apparatus]

Hereinbelow, a favorable embodiment of the present disclosure will be described with reference to the drawings. In the present embodiment, a so-called complex machine (MFP) having print, scan, facsimile and copy functions is described. The complex machine may have only the copy function.

Figure 1:
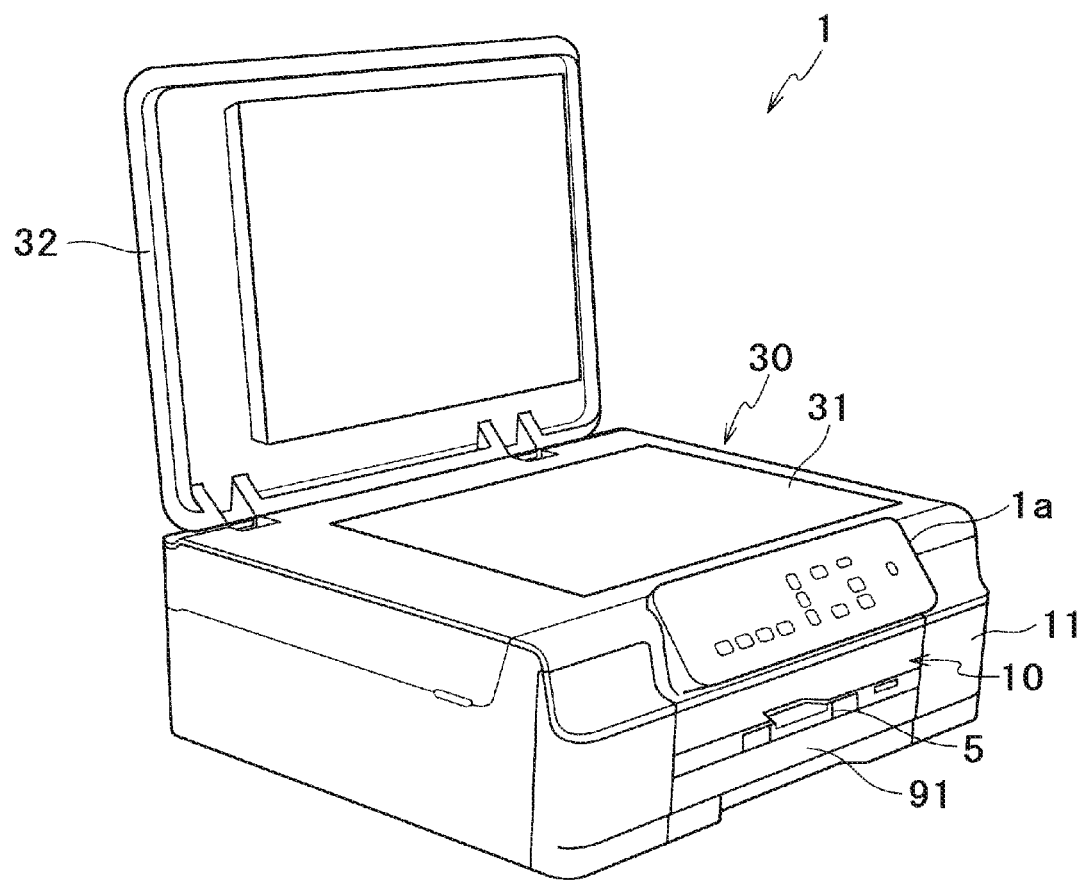
FIG. 1 is a perspective view depicting a complex machine as an image forming apparatus in accordance with an embodiment of the present disclosure.

As shown in FIG. 1, a complex machine 1 includes a housing 11, a cover 32 attached to the housing 11 so as to be swingable between a position in which an upper surface of the housing 11 is covered and a position in which the upper surface is not covered, a sheet feeding tray 91 detachably accommodated in the housing 11 from an opening 13 (refer to FIG. 2) provided at a lower part of the housing 11, a discharge tray 5, and a bypass tray 93 (refer to FIG. 2) positioned on a backside of the housing 11. In the housing 11, a print unit 10 configured to form an image on a sheet in an inkjet manner is disposed. Also, a flatbed-type reading unit 30 configured to read a document to generate image data is disposed above the print unit 10. As a modified embodiment, the reading unit 30 may include an auto document feeder (ADF). An operation panel 1a disposed on a surface of the housing 11 is not provided with a display such as a liquid crystal panel and a ten-key board, and is provided with several physical keys such as a copy start key (for example, an operation key 28 shown in FIG. 2) and a guide ramp (for example, an LED lamp 29 shown in FIG. 2).

Figure 3:
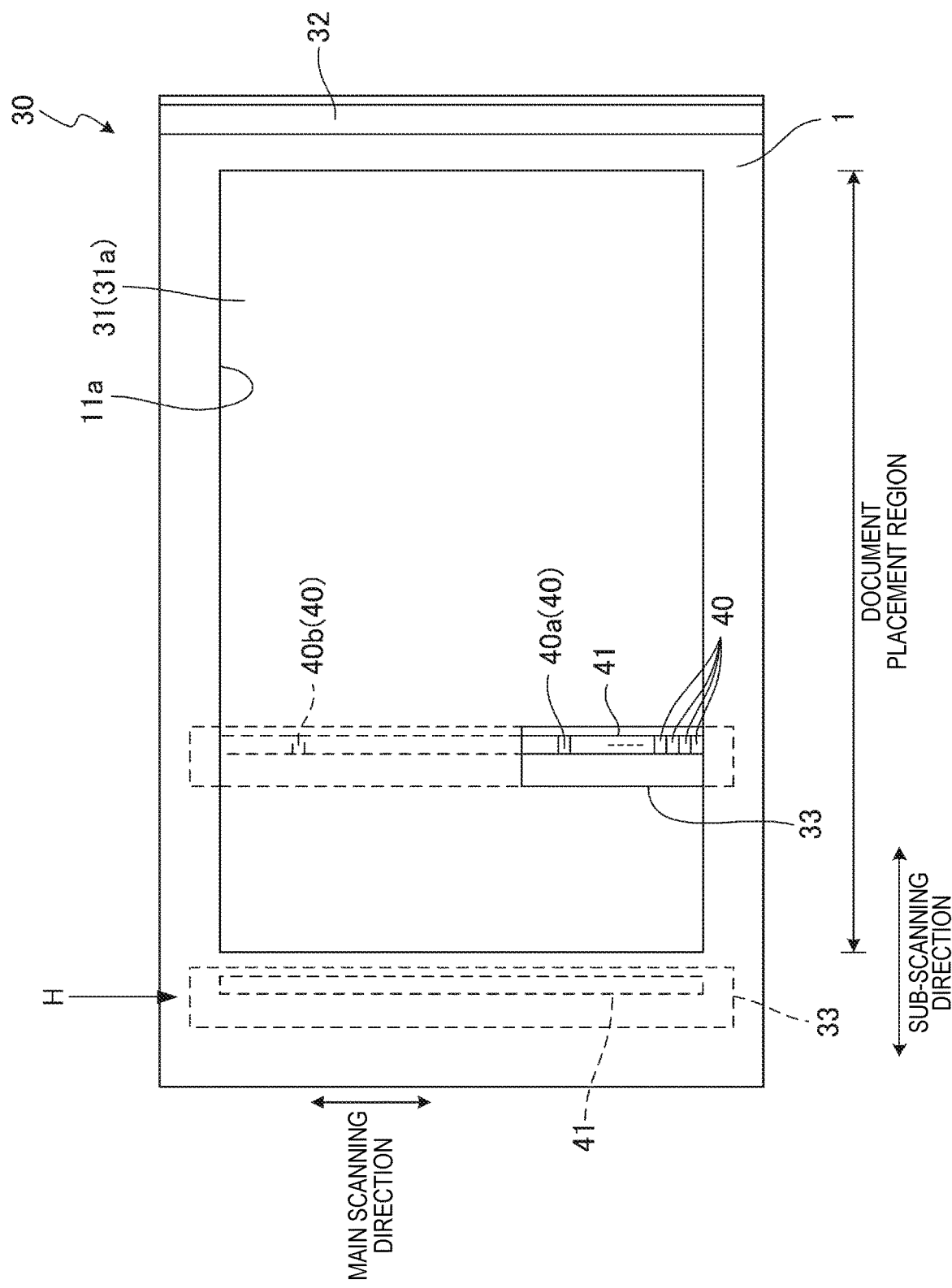
FIG. 3 is a plan view depicting a state in which a cover of a reading device mounted in the complex machine shown in FIG. 1 is opened.

The reading unit 30 includes a platen glass 31, the cover 32, and a reading device 33 (refer to FIG. 3). The platen glass 31 is a translucent plate-shaped member and is fitted in an opening 11a (refer to FIGS. 3 and 4) of the upper surface of the housing 11.

Figure 2:
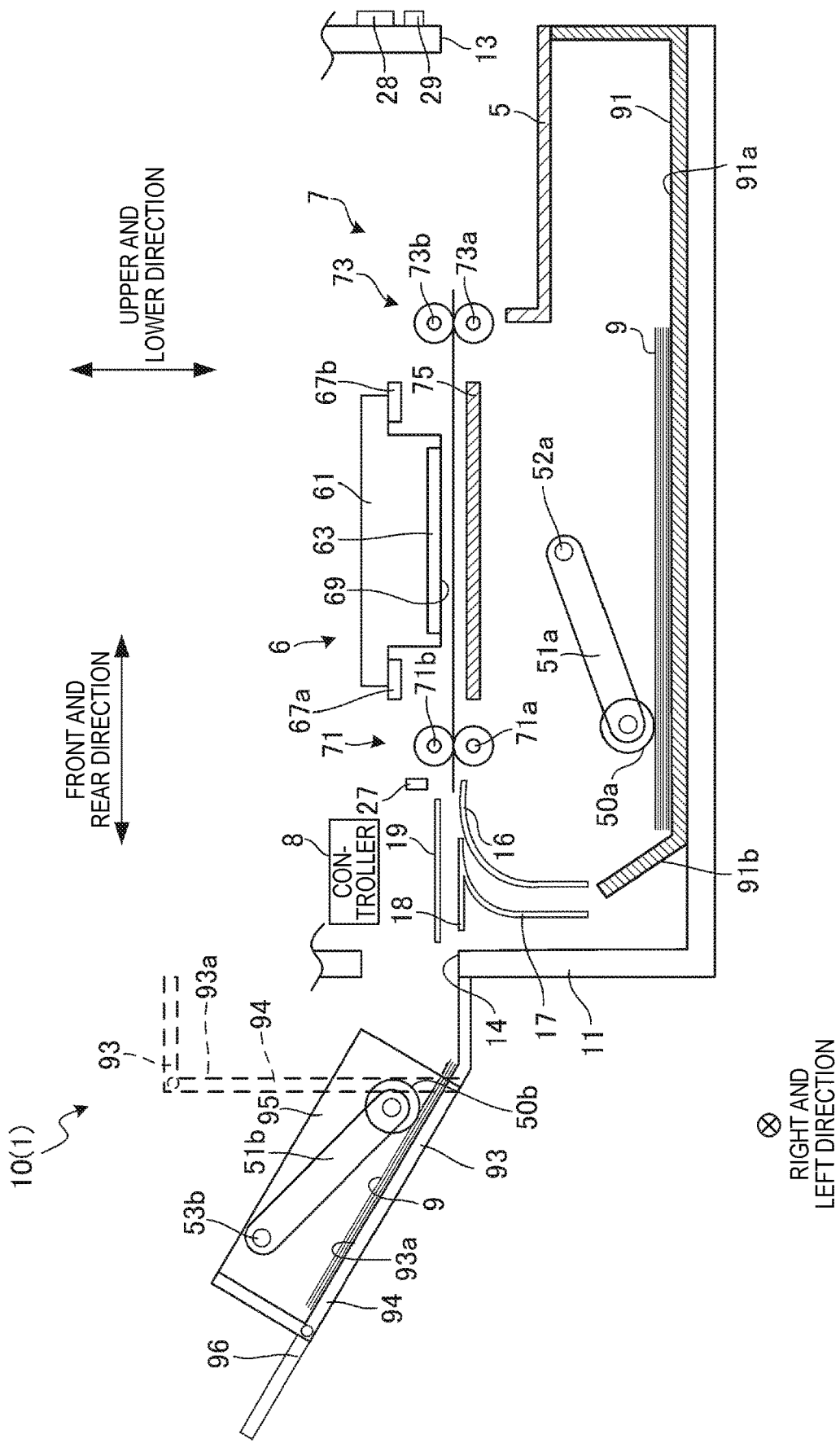
FIG. 2 is a schematic side view depicting an internal structure of a print unit mounted in the complex machine shown in FIG. 1.

FIG. 2 depicts an internal configuration of the print unit 10 in the complex machine 1. In descriptions below, an upper and lower direction is defined on the basis of a state (a state shown in FIG. 2) in which the complex machine 1 is usably equipped, a front and rear direction is defined on the basis of a front side (front face) of the housing 11 on which the opening 13 is provided, and a right and left direction is defined when the complex machine 1 is seen from the front side (front face).

[Print Unit]

As shown in FIG. 2, the print unit 10 includes a sheet feeding tray 91, a bypass tray 93, a discharge tray 5, a print module 6, a conveyor 7, and a controller 8. The sheet feeding tray 91, the print module 6, the conveyer 7, and the controller 8 are accommodated in the housing 11 of the complex machine 1. The controller 8 is configured to control the entire complex machine 1. In the housing 11, the sheet feeding tray 91 is disposed below the print module 6. The front face of the housing 11 is provided with one or more operation keys 28 and one or more LED lamps 29. In the meantime, although not shown in FIG. 2, the complex machine 1 further includes a flatbed-type reading unit (image scanner) 30 disposed above the print module 6, and a facsimile communication unit 26 (refer to FIG. 5) configured to perform facsimile reception/transmission.

The sheet feeding tray 91 can accommodate a plurality of stacked sheets 9 while supporting the same. The sheet feeding tray 91 can be taken in and out from the opening 13 formed in the front face of the housing 11 in the front and rear direction. In the meantime, the discharge tray 5 is disposed above a front side of the sheet feeding tray 91, and is adapted to move together with the sheet feeding tray 91. The sheet feeding tray 91 has a support surface 91a for supporting the sheet 9. The support surface 91a is a surface perpendicular to the upper and lower direction. When the sheet feeding tray 91 is positioned in the housing 11, the support surface 91a is exposed to an internal space of the housing 11. A rear end portion of the sheet feeding tray 91 is provided with a tilted plate 91b.

The bypass tray 93 is disposed so as to close an opening 14 formed in the backside of the housing 11. The bypass tray 93 is configured so that a lower end portion of a base plate 94 having a support surface 93a for supporting the sheet 9 is rotatable about an axis extending in the right and left direction. The bypass tray 93 covers the opening 14 in a position (hereinbelow, simply referred to as "upright position") in which the base plate 94 is in an upright state, as shown with the broken line in FIG. 2. In the upright position, the support surface 93a faces the opening 14. The bypass tray 93 is rotatable about the lower end portion of the base plate 94 from the upright position to a position (hereinbelow, simply referred to as "tilted position") tilted with respect to the upper and lower direction. In the tilted position, the support surface 93a faces obliquely upwards with a rotary shaft facing downward. Both ends of the base plate 94 in the right and left direction and an opposite end to a rotation end are provided with sidewalls 95 and 96 erected to surround the support surface 93a, so that the bypass tray 93 is formed to have a substantial box shape. The sidewall 96 of the base plate 94 erected on the opposite end to the rotation end is configured so that an end portion thereof facing toward the base plate 94 is rotatable about an axis extending in the right and left. When supporting the sheet 9 on the bypass tray 93, the base plate 94 is set to the tilted position and the sidewall 96 is rotated to make an inner surface thereof (an inwardly facing surface in the case of the bypass tray 93 having a substantial box shape) be flush with the support surface 93a. At this time, the support surface 93a of the bypass tray 93 is exposed to an outside.

In the present embodiment, a maximum loadable amount of sheets on the bypass tray 93 is smaller than a maximum loadable amount of sheets on the sheet feeding tray 91. In the meantime, one or more separate sheet feeding trays having the same size as the sheet feeding tray 91 may be disposed below the sheet feeding tray 91. Even when the complex machine 1 includes three or more sheet feeding units, the maximum loadable amount of sheets on the bypass tray 93 of all the trays is the smallest.

The print module 6 includes a carriage 61 and a recording head 63. The carriage 61 is supported by two guide rails 67a and 67b. The two guide rails 67a and 67b are disposed with being spaced in the front and rear direction, and extend in the right and left direction. The carriage 61 is disposed to extend over the two guide rails 67a and 67b. The carriage 61 is configured to reciprocally move in the right and left direction, which is a main scanning direction, along the two guide rails 67a and 67b by a carriage drive motor 21 (refer to FIG. 5). The recording head 63 is mounted to the carriage 61. The recording head 63 is configured to discharge ink, which is supplied from an ink cartridge (not shown), from a plurality of nozzles (not shown) provided to a nozzle surface 69 of a lower surface.

The conveyer 7 is provided so as to convey the sheet 9 inside the print unit 10, and includes feeder rollers 50a and 50b, a pair of conveyor rollers 71, a pair of discharge rollers 72, a platen 75, and guide members 16 to 19. The feeder roller 50a is configured to send rearward the sheet 9 in the sheet feeding tray 91. The feeder roller 50b is configured to send the sheet 9 in the bypass tray 93 toward the opening 14.

The feeder roller 50a is disposed above the sheet feeding tray 91. The feeder roller 50a is rotatably supported to one end portion of an arm 51a. The other end portion of the arm 51a, which is opposite to the one end supporting the feeder roller 50a, is supported by a support shaft 52a fixed to the housing 11 and extending in the right and left direction. The arm 51a is swingable about the support shaft 52a in a plane perpendicular to the right and left direction. The arm 51a is urged in a direction by a spring (not shown) in which the feeder roller 50a presses the sheet 9 supported on the sheet feeding tray 91, and the feeder roller 50a is in contact with the uppermost sheet 9 of the sheets supported on the sheet feeding tray 91. Also, the feeder roller 50a is configured to rotate by drive force applied from a feeder motor 22a (refer to FIG. 5).

The feeder roller 50b is disposed in a position in which the feeder roller 50b faces the support surface 93a of the bypass tray 93. The feeder roller 50b is rotatably supported to one end portion of an arm 51b. The other end portion of the arm 51b, which is opposite to the one end supporting the feeder roller 50b, is supported by a support shaft 53b fixed to the bypass tray 93 and extending in the right and left direction. The arm 51b is swingable about the support shaft 53b in the plane perpendicular to the right and left direction. Also, the arm 51b is urged in a direction by a spring (not shown) in which the feeder roller 50b presses the uppermost sheet 9 of the sheets supported on the bypass tray 93. Also, the feeder roller 50b is configured to rotate by drive force applied from a feeder motor 22b (refer to FIG. 5).

The feeder roller 50b, the arm 51b, and the support shaft 53b are disposed in a region surrounded by the base plate 94 and the three sidewalls 95 and 96 of the bypass tray 93. That is, the feeder roller 50b, the arm 51b, and the support shaft 53b are accommodated in the box-shaped bypass tray 93.

The pair of conveyor rollers 71 and the pair of discharge rollers 73 are disposed with sandwiching the print module 6 in the front and rear direction, and the pair of conveyor rollers 71 is disposed at the rear of the print module 6 and the pair of discharge rollers 73 is disposed in front of the print module 6. The platen 75 is disposed to face the nozzle surface 69 of the print module 6 below the print module 6.

The pair of conveyor rollers 71 is configured by a drive roller 71a configured to rotate by drive force applied from a conveyor motor 23 (refer to FIG. 5) and a driven roller 71b configured to rotate in conjunction with rotation of the drive roller 71a. The pair of discharge rollers 73 is configured by a drive roller 73a configured to rotate by drive force applied from the conveyor motor 23 and a driven roller 73b configured to rotate in conjunction with rotation of the drive roller 73a.

The guide members 16 to 19 are disposed in the vicinity of a rear end portion of the housing 11. The guide members 16 and 17 are disposed to face each other at a predetermined interval in the front and rear direction. The guide members 16 and 17 form therebetween a conveying path of the sheet 9 fed from the sheet feeding tray 91. The guide members 16 and 17 are a bent plate-shaped member and extend from the vicinity of a rear end portion of the sheet feeding tray 91 to the vicinity of the pair of conveyor rollers 71.

The sheet 9 delivered rearward from the sheet feeding tray 91 by the feeder roller 50 is caused to face obliquely upward by the tilted plate 91b provided to the rear end portion of the sheet feeding tray 91, passes between the guide members 16 and 17, and then reaches a position in which the sheet is sandwiched by the pair of conveyor rollers 71.

The guide members 18 and 19 are a plate-shaped member extending from the vicinity of the opening 14 to the vicinity of the pair of conveyor rollers 71 and are disposed to face each other at a predetermined interval in the upper and lower direction. The guide members 18 and 19 form therebetween a conveying path of the sheet 9 fed from the bypass tray 93. The conveying path formed by the guide members 18 and 19 and the conveying path formed by the guide members 16 and 17 converge upstream of the pair of conveyor rollers 71.

The sheet 9 fed from the bypass tray 93 by the feeder roller 50b is sent into the housing 11 through the opening 14, passes between the guide members 18 and 19 and reaches a position in which the sheet is sandwiched by the pair of conveyor rollers 71.

The sheet 9 fed from the sheet feeding tray 91 or the bypass tray 93 and sandwiched by the pair of conveyor rollers 71 is conveyed forward by the pair of conveyor rollers 71. The sheet 9 conveyed forward by the pair of conveyor rollers 71 is discharged thereon with the ink from the nozzles (not shown) of the recording head 63 moving in the main scanning direction, in a state in which the sheet is supported by the platen 75, so that an image is recorded on the sheet 9. The recorded sheet 9 is conveyed forward by the pair of discharge rollers 73 and is then discharged onto the discharge tray 5.

[Reading Unit]

Figure 4:
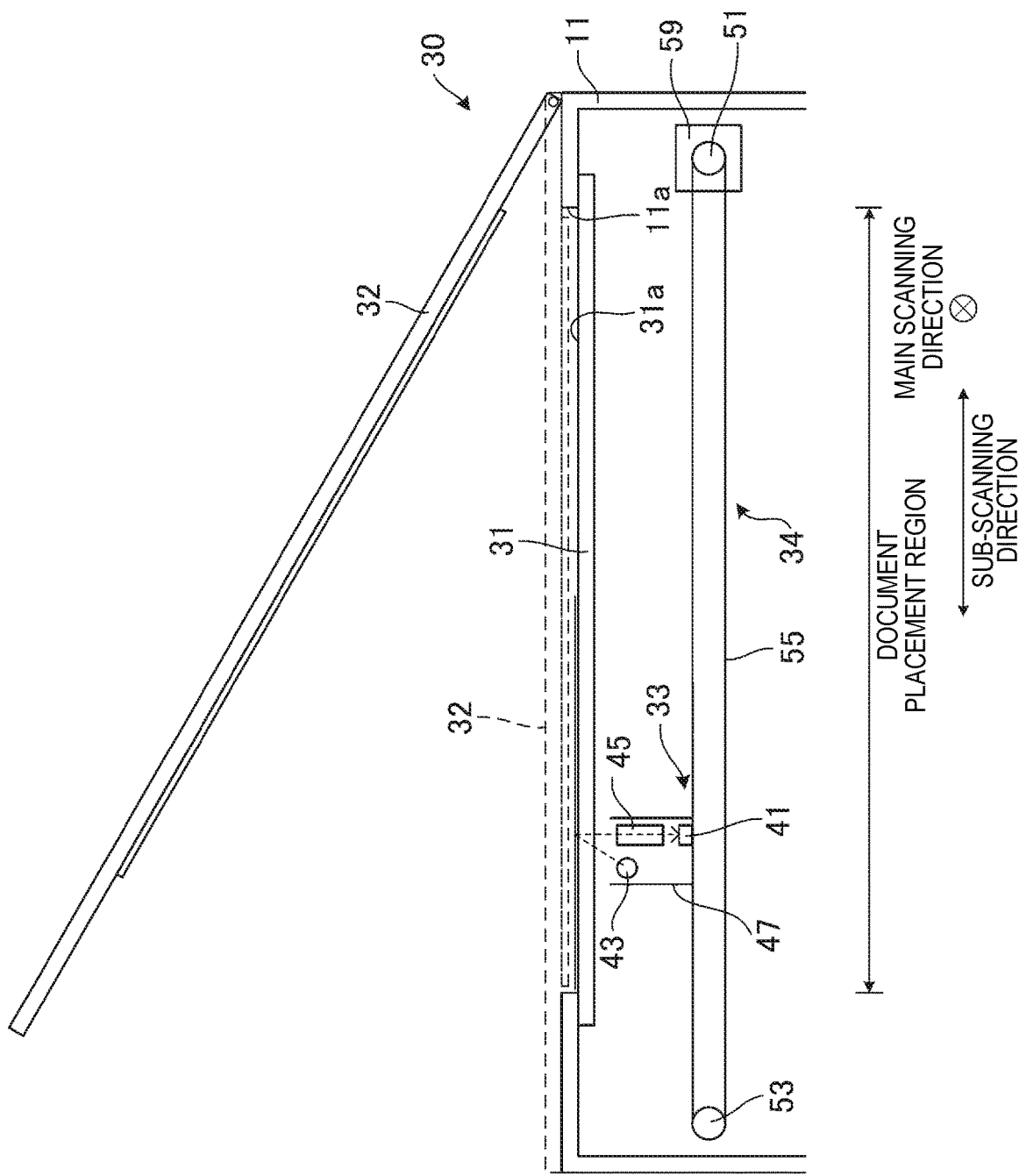
FIG. 4 is a schematic side view depicting an internal structure of the reading device shown in FIG. 3.

Subsequently, a configuration of the reading unit 30 is described with reference to FIGS. 3 and 4. The reading unit 30 includes the translucent platen glass 31, the cover 32, the reading device 33, and a movement mechanism 34. The platen glass 31 closes the opening 11a formed in the upper part of the cuboid-shaped housing 11 of the complex machine 1, from an inside of the housing 11. A part, which is exposed from the opening 11a, of an upper surface 31a of the platen glass 31 is formed as an image reading surface as a translucent document placement region capable of supporting a document.

The cover 32 is rotatably supported at one end portion to the upper surface of the housing 11, and can be in a close position (a position shown with the broken line in FIG. 4) in which the upper surface 31a of the platen glass 31 is covered and an open position (a position shown with the solid line in FIG. 4) in which the upper surface 31a is exposed. In the meantime, FIG. 3 depicts a position of the reading device 33 when the reading unit 30 is seen from above in the state in which the cover 32 is located in the open position, and the movement mechanism 34 is not shown.

The reading device 33 and the movement mechanism 34 are disposed inside of the housing 11. As shown in FIG. 4, the reading device 33 is configured by an image sensor 41 having a CMOS (Complementary Metal Oxide Semiconductor) or CCD (Charge Coupled Device), a light source 43, a rod lens array 45, a carriage 47 on which the image sensor 41, the light source 43, and the rod lens array 45 are mounted, and the like. Meanwhile, in FIG. 3, only the image sensor 41 is shown. As shown in FIG. 3, the image sensor 41 is a linear image sensor in which a plurality of light-receiving elements 40 is aligned in the main scanning direction (the upper and lower direction on the drawing sheet of FIG. 3) parallel to the upper surface 31a of the platen glass 31. The light source 43 is configured by a light-emitting diode or the like, and is configured to emit a light beam toward the platen glass 31. The rod lens array 45 is configured to form, on each light-receiving element of the image sensor 41, an image of the light beam emitted from the light source 43 and reflected by an obstacle. The image data as an analog signal output from the image sensor 41 is converted into a digital signal by an AD converter 48 (refer to FIG. 5) and is supplied to the controller 8.

The movement mechanism 34 is to move the reading device 33 in a sub-scanning direction (the right and left direction on the drawing sheet of FIG. 4) perpendicular to the main scanning direction, in the plane parallel to the upper surface 31a of the platen glass 31. As shown in FIG. 4, the movement mechanism 34 is configured by a drive roller 51 configured to drive by a motor 59 capable of rotating in forward and reverse directions, a driven roller 53, an endless belt 55 extending over the drive roller 51 and the driven roller 53, and the like. The belt 55 is attached thereon with the carriage 47 of the reading device 33 and travels by the rotation of the drive roller 51, so that the reading device 33 is reciprocally movable in the sub-scanning direction. The drive roller 51 and the driven roller 53 are disposed outside of the image reading surface of the platen glass 31 with respect to the sub-scanning direction. Therefore, the reading device 33 is movable from one end to the other end of the image reading surface of the platen glass 31 with respect to the sub-scanning direction by the movement mechanism 34. In the meantime, the reading device 33 is disposed in a home position (a position denoted with an arrow H), which is located on a side (a left side in FIG. 3) of the image reading surface of the platen glass 31 with respect to the sub-scanning direction and does not face the image reading surface, while a scanning operation is not performed. In the present embodiment, a preparation operation (which will be described in detail later) of acquiring a control parameter for reading a document is performed in a state in which the reading device 33 is located in the home position.

In the present embodiment, when performing a copy operation of forming, on the sheet, the same image as a document read by the reading unit 30, the reading unit 30 reads a document placed on the upper surface 31a of the platen glass 31 and outputs image data having a high resolution (first resolution) or image data having a low resolution (second resolution lower than the first resolution). The reading processing of generating the image data having the high resolution is referred to as reading processing in a high resolution reading mode, and the reading processing of generating the image data having the low resolution is referred to as reading processing in a low resolution reading mode. As described later, the reading unit 30 outputs high resolution image data when a number of copies is one sheet, and outputs low resolution image data when a number of copies is two or more sheets.

[Block Configuration]

Figure 5:
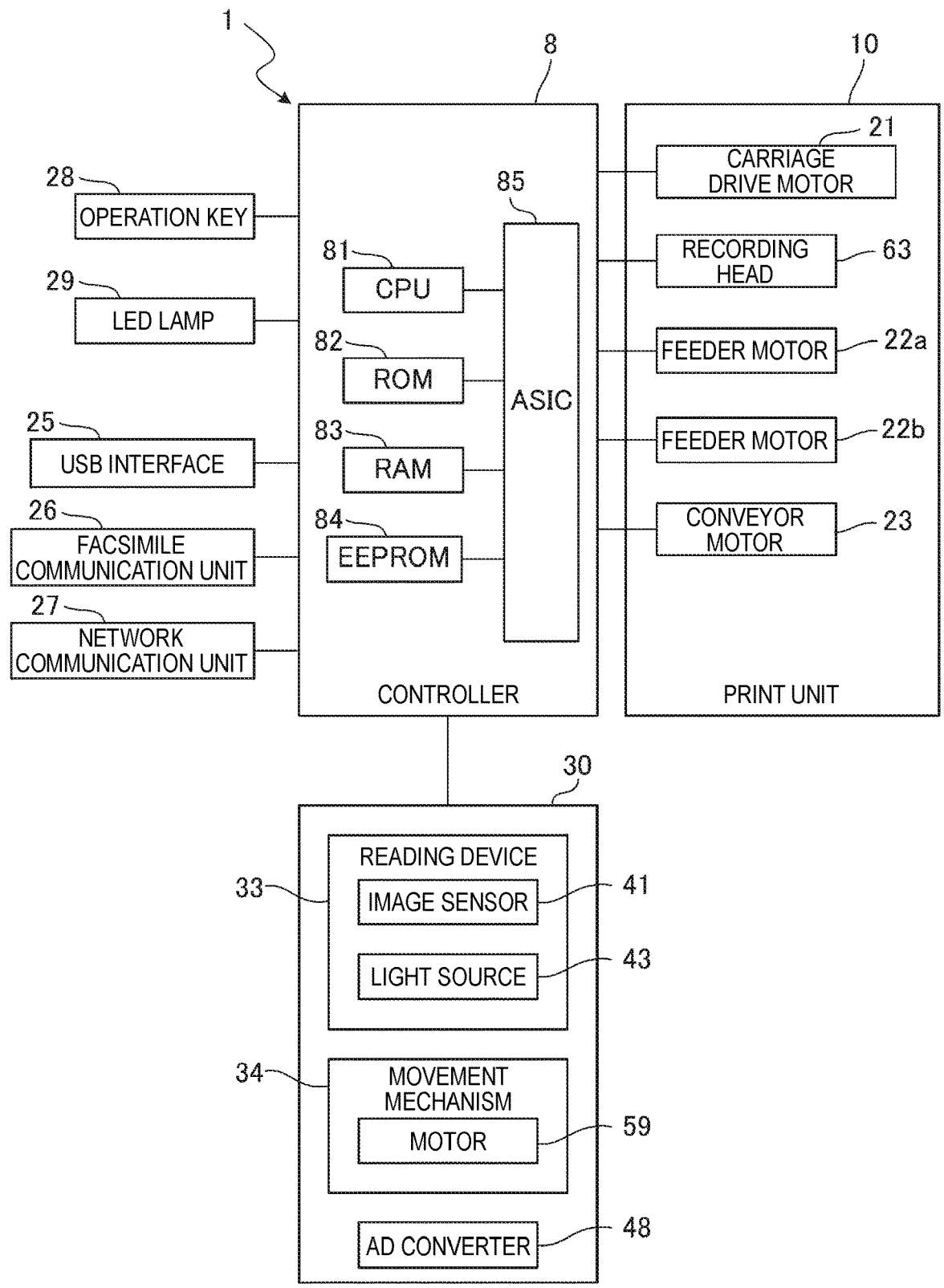
FIG. 5 is a block diagram of the complex machine shown in FIG. 1.

Subsequently, a block configuration of the complex machine 1 in accordance with the present embodiment is described with reference to FIG. 5. As shown in FIG. 5, the controller 8 of the complex machine 1 is electrically connected with the one or more operation keys 28 and the one or more LED lamps 29. The operation key 28 is configured to output an output signal corresponding to a user operation to the controller 8. The operation key 28 at least includes two keys for selecting and executing a monochrome copy operation and a color copy operation of forming, on the sheet, the same image as the document read with the reading unit 30. The operation key 28 (hereinbelow, referred to as "specific key 28") for selecting and executing monochrome or color copy is configured to output a pulse signal having a width corresponding to a pressing period, for example. In the present embodiment, when a predetermined time (for example, one second) has elapsed without the specific key 28 being again pressed since the last pressing of the specific key 28, the number of pressing times of the specific key 28 is decided as a number of copies. The LED lamp 29 can perform notification to a user by switching a display aspect (lights-out, lighting, blinking and the like), based on the output signal from the controller 8.

Also, the controller 8 is electrically connected with the carriage drive motor 21 of the print unit 10, the recording head 63, the feeder motors 22a and 22b, and the conveyor motor 23. Also, the controller 8 is electrically connected with the image sensor 41 and the light source 43 of the reading device 33 and the motor 59 of the movement mechanism 34, which are included in the reading unit 30. The controller 8 is electrically connected with a USB (Universal Serial Bus) interface 25. The USB interface 25 is a USB standard interface, and a USB memory as a removable memory can be connected to the USB interface 25.

The controller 8 is also electrically connected with a facsimile communication unit 26 and a network communication unit 27. The facsimile communication unit 26 is configured to transmit and receive the image data as a facsimile signal to and from a communication destination device, via a phone line. The network communication unit 27 is configured to perform network communication based on various types of communication standards such as a wired LAN and a wireless LAN. Therefore, the complex machine 1 can perform communication with an external communication device based on the communication standards, via the network communication unit 27.

As shown in FIG. 5, the controller 8 includes a CPU (Central Processing Unit) 81, a ROM (Read Only Memory) 82, a RAM (Random Access Memory) 83, an EEPROM (Electrically Erasable Programmable Read-Only Memory) 84, and an ASIC (Application Specific Integrated Circuit) 85, which cooperate to control operations of the print unit 10, the facsimile communication unit 26, the network communication unit 27 and each unit of the reading unit 30.

In the RAM 83, the high resolution image data or the low resolution image data generated by reading the document in the reading unit 30 is temporarily stored. In the present embodiment, when printing only one copy by using the high resolution image data, printing processing is started after the reading processing is started and before the reading processing is over, and printed part of the image data is deleted during the reading processing due to capacity limit of the RAM 83. This is hereinbelow referred to as direct copy mode. On the other hand, when performing the printing by using the low resolution image data, printing processing of multiple copies is started based on image data corresponding to one document sheet stored in the RAM 83 after the reading processing is over. This is hereinbelow referred to as memory copy mode.

The EEPROM 84 functions as a reading parameter storage for storing a control parameter used for reading the document by the reading unit 30, and as a setting information storage for storing setting information that is settable by a user with respect to operations of the complex machine 1 (selection of a tray for sheet feeding, a print image quality, a printing direction, a color mode, a duplex printing, enlargement/reduction, page aggregation, and the like).

As the control parameter used for reading the document by the reading unit 30, an adjustment parameter of a current value to be supplied to the light source 43 in the reading unit 30, an adjustment parameter of a reference voltage of the AD converter 48 in the reading unit 30, and a correction parameter of a monochrome density for density adjustment of the image data may be exemplified, for example. The control parameters are acquired by preparation operations performed by the reading unit 30, which will be described later. The control parameter is required to be changed depending on whether the reading unit 30 is to output the high resolution image data or the low resolution image data (the control parameter corresponding to a case of the high resolution is referred to as a first control parameter, and the control parameter corresponding to a case of the low resolution is referred to as a second control parameter). Therefore, as the preparation operation, it is necessary to perform at least one of a first preparation operation corresponding to the high resolution and a second preparation operation corresponding to the low resolution.

In the present embodiment, as the selection information of a tray for sheet feeding of the setting information is settable by the user with respect to the operations of the complex machine 1, it is assumed in descriptions below that the EEPROM 84 stores that the bypass tray 93 of which a maximum loadable amount of sheets is smaller than the sheet feeding tray 91 is to be used.

Meanwhile, in FIG. 5, one CPU 81 and one ASIC 85 are shown. However, the controller 8 may include only one CPU 81 and the one CPU 81 may be configured to collectively execute necessary processing, or may include a plurality of CPUs 81 and the plurality of CPUs 81 may be configured to share necessary processing. Also, the controller 8 may include only one ASIC 85 and the one ASIC 85 may be configured to collectively execute necessary processing, or may include a plurality of ASICs 85 and the plurality of ASICs 85 may be configured to share necessary processing.

[Operations of Complex Machine and Mobile Terminal]

Figure 6A:
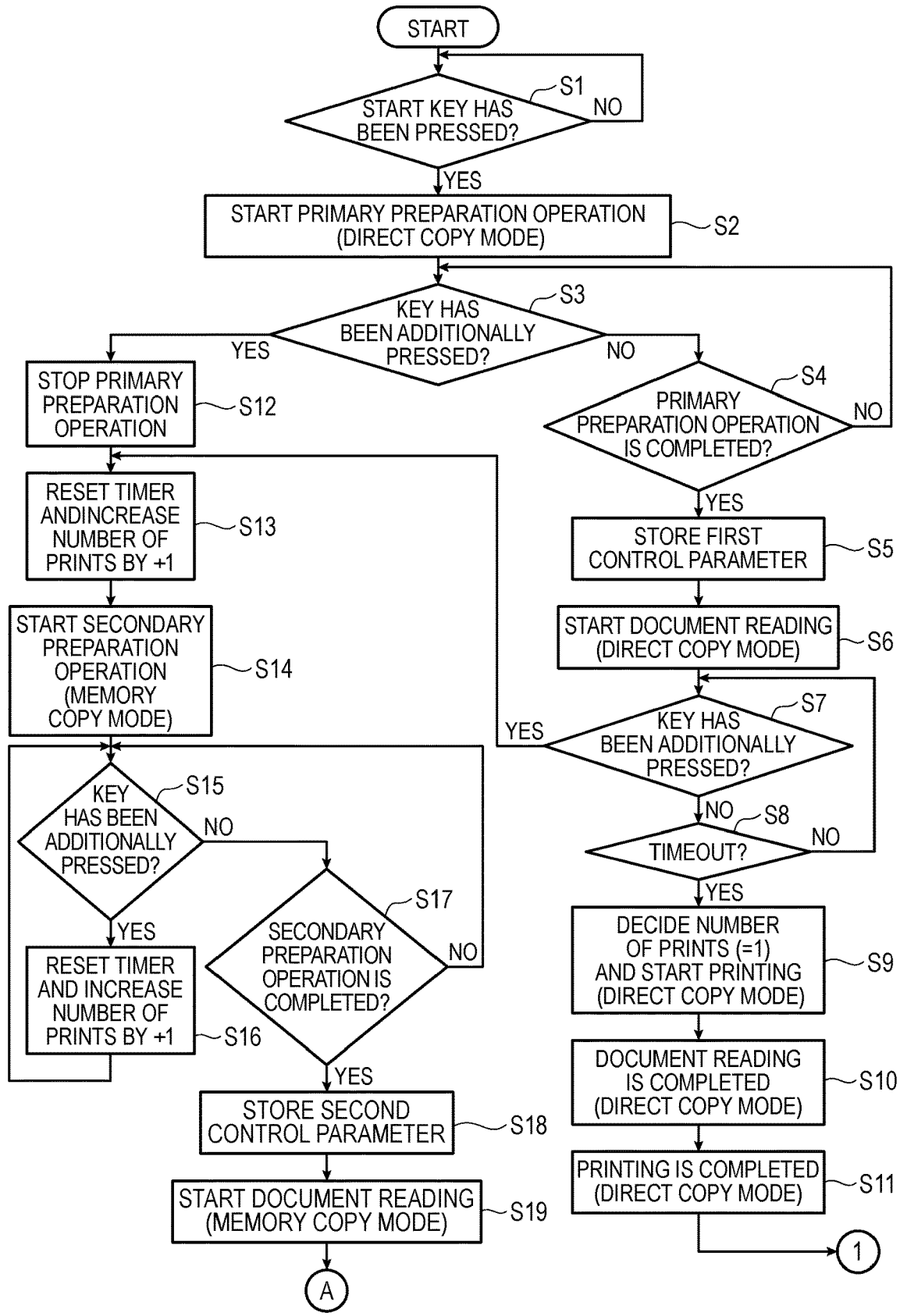
FIGS. 6A and 6B are flowcharts depicting operations of the complex machine shown in FIG. 1.
Figure 6B:
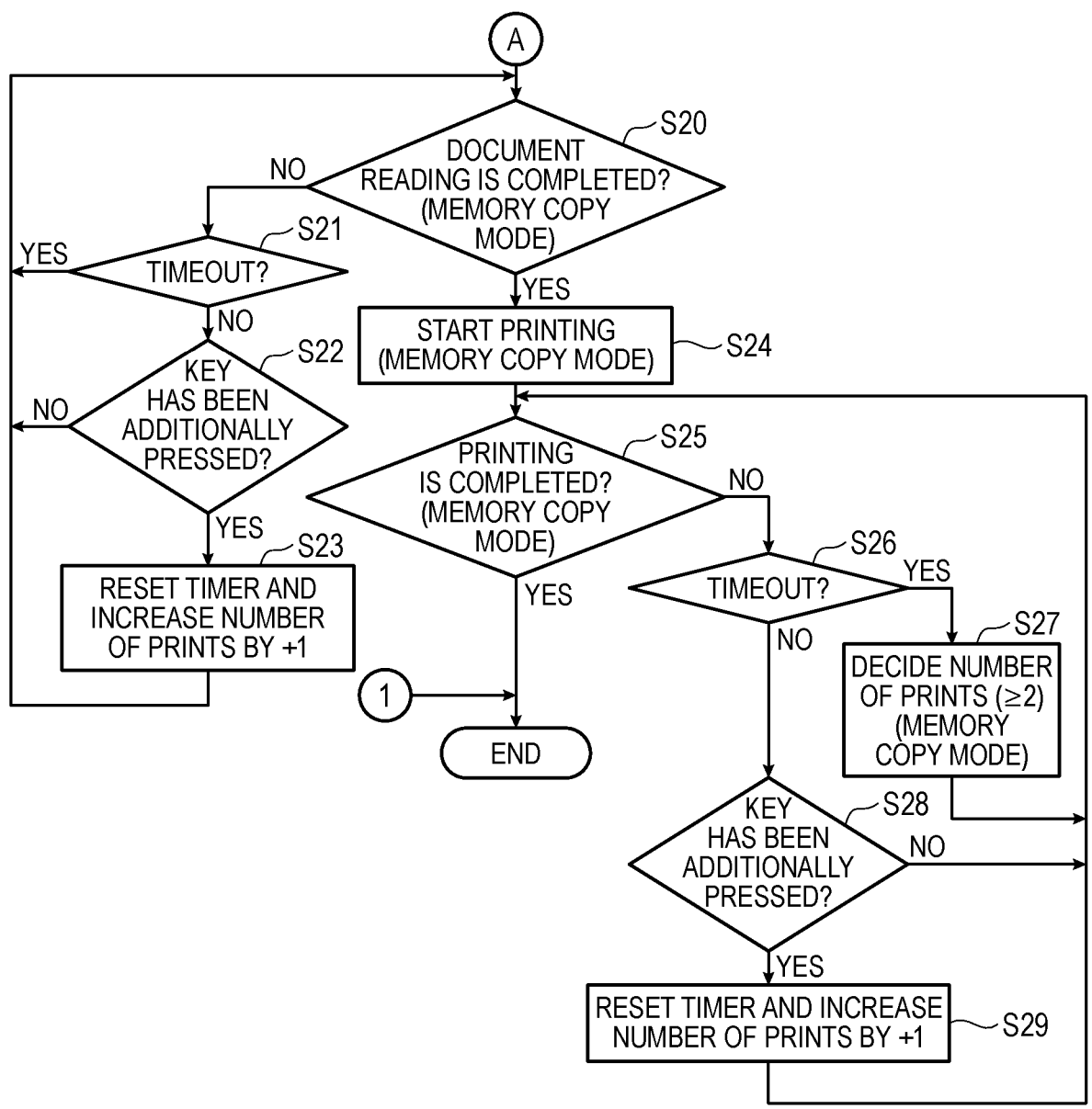

Subsequently, an example of the operation of the complex machine 1, which is performed when an image is formed on a sheet with the print unit 10 by using the image data generated by operating the specific key (print start key) 28 of the complex machine 1 to perform the copy operation, i.e., to read the document with the reading unit 30 of the complex machine 1, is described with reference to FIGS. 6A and 6B. The operations described below are executed under control of the controller 8 of the complex machine 1. Meanwhile, in the example below, it is assumed that the number of copies is fixed at the time when the specific key 28 is not pressed for one second since the last pressing thereof.

When it is intended to cause the complex machine 1 to perform the copy operation, the user first arranges the document on the image reading surface of the platen glass 31 and then presses the monochrome or color specific key 28. The complex machine 1 determines whether the specific key 28 has been pressed, in S1. When it is determined that the specific key 28 has been pressed (S1: YES), the controller 8 saves "1" in the RAM 83, as the number of prints, and proceeds to S2. Also, the controller 8 starts to count a timer simultaneously with determining that the specific key 28 has been pressed. In S2, the reading unit 30 starts a primary preparation operation (primary preparation operation start processing). In the present embodiment, the primary preparation operation corresponds to the direct copy mode, and is performed so as to acquire the first control parameter for reading the document in the high resolution reading mode. Specifically, in a state in which the reading device 33 is located in the home position, in each of cases corresponding to when a predetermined current is supplied to the light source 43 and when no current is supplied to the light source 43, a predetermined region (for example, a white region and a black region) of the housing 11 is read by the image sensor 41, an output signal is analyzed in the controller 8, and various operation parameters (for example, the adjustment parameter of the current value to be supplied to the light source 43) suitable for reading the document in the high resolution reading mode are acquired.

In the present embodiment, the primary preparation operation is set as the first preparation operation corresponding to the direct copy mode because the EEPROM 84 stores, as the selection information of a tray for sheet feeding, that the bypass tray 93 of which the maximum loadable amount of sheets is smaller than the sheet feeding tray 91 is to be used. If the EEPROM 84 stores, as the selection information of a tray for sheet feeding, that the sheet feeding tray 91 is to be used, the primary preparation operation is set as a second preparation operation (refer to a second modified embodiment) corresponding to the memory copy mode.

It is determined whether the specific key 28 has been additionally pressed since the start of the primary preparation operation in S2 (S3). When it is determined that the specific key has not been additionally pressed (S3: NO), it is determined whether the primary preparation operation is completed (S4). When it is determined that the primary preparation operation is not completed (S4: NO), the processing returns to S3. In the present embodiment, it is presumed that the primary preparation operation is completed within one second (i.e., a predetememrined time for fixing the number of copies) since the start of the primary preparation operation. That is, when it is determined in S3 that the specific key 28 has been pressed, the pressing has been made within one second since the pressing in S1, and an interval from a signal output as a result of the pressing in S1 to a signal output as a result of the pressing in S3 is within one second. When it is determined that the primary preparation operation is completed (S4: YES), the first operation parameter acquired by the primary preparation operation is stored in the EEPROM 84 (S5).

In S6, the reading unit 30 starts to reading the document in the high resolution reading mode using the first operation parameter. The image data generated as a result of the reading is saved in the RAM 83. In the present embodiment, a time necessary for reading the document is longer than one second in both modes of the direct copy mode and the memory copy mode. In S7, it is determined whether the specific key 28 has been pressed. When it is determined that the specific key 28 has not been pressed (S7: NO), it is determined in S8 whether one second has elapsed since the pressing of the specific key 28 in S1 (timeout). When it is determined that one second has not elapsed (S8: NO), the processing returns to S7 to repeatedly determine whether the specific key 28 has been pressed. Also, when it is determined that the specific key 28 has been pressed (S7: YES), it is deter mined that the number of prints is two or greater (determination processing), and the processing proceeds to S13, which will be described later. Also in this case, an interval from the signal output as a result of the pressing in S1 to a signal output as a result of the pressing in S7 is within one second. Meanwhile, in the case in which the processing proceeds from S7 to S13, it is not regarded that the reading processing has been executed in the present disclosure because the reading processing started in S6 has not been completed.

When it is determined that one second has elapsed (S8: YES), since there is no pressing for one second after the specific key 28 has been pressed in S1, it is determined in S9 that the number of prints is "1", and the number of prints is decided as "1" (determination processing and decision processing). Also, based on the high resolution image data formed as a result of the image reading in the reading unit 30 started in S6, the print unit 10 starts to print one copy in S9. At this time, the image is being continuously read by the reading unit 30. Also, the image data saved in the RAM 83 is deleted in order of the image data of which printing has been completed.

After the document reading is completed in S10 (the processing from S6 to S10 is reading processing), the printing of one copy is completed in S11 (the processing from S9 to S11 is recording processing), so that the copy operation in the direct copy mode is over.

Returning to S3, when it is determined that the specific key 28 has been additionally pressed before the completion of the primary preparation operation (S3: YES), it is determined in S12 that the number of prints is two copies or more (determination processing), and the primary preparation operation started in S2 is stopped. Specifically, the current supply to the light source 43 is stopped and the calculation performed halfway is stopped. In S13, the timer is reset and the number of prints is increased by one (i.e. +1) (here, the number of prints becomes two). In the meantime, when the processing is shifted from S7 and the processing S13 is executed, the image data saved in the RAM 83 is further deleted.

In S14, the reading unit 30 starts a secondary preparation operation (secondary preparation operation start processing). In the present embodiment, the secondary preparation operation corresponds to the memory copy mode, and is performed so as to acquire the second control parameter for reading the document in the low resolution reading mode. The specific operations of the memory copy mode are the same as the operations of the direct copy mode.

Then, in S15, it is determined whether the specific key 28 has been pressed. When it is determined that the specific key 28 has not been pressed (S15: NO), it is determined whether the secondary preparation operation is completed (S17). When it is determined that the secondary preparation operation is not completed (S17: NO), the processing returns to S15. In the present embodiment, it is presumed that the secondary preparation operation is completed within one second (i.e., a predetermined time for fixing the number of copies) since the start of the secondary preparation operation. On the other hand, when it is determined that the specific key 28 has been pressed (S15: YES), the timer is reset and the number of prints is increased by one (i.e. +1), in S16, and the processing returns to S15 to repeatedly determine whether the specific key 28 has been pressed. Also in this case, an interval from the signal output as a result of the previous pressing of the specific key 28 in S3, S7 or S15 to a signal output as a result of the pressing in S15 is within one second.

When it is determined that the secondary preparation operation is completed (S17: YES), the second operation parameter acquired by the secondary preparation operation is stored in the EEPROM 84 (S18).

Then, in S19, the reading unit 30 starts reading the document in the low resolution reading mode using the second operation parameter. Continuously, it is determined in S20 whether the document reading is completed (the processing from S19 to S20 is reading processing).

When it is determined that the document reading is not completed (S20: NO), it is determined in S21 whether one second has elapsed since the timer reset in S13 or S16, i.e., the last pressing of the specific key 28. When it is determined that one second has elapsed (S21: YES), the processing returns to S20 to repeatedly determine whether the document reading is completed. When it is deter mined that one second has not elapsed (S21: NO), it is determined in S22 whether the specific key 28 has been additionally pressed. When it is determined that the specific key 28 has not been pressed (S22: NO), the processing returns to S20 to repeatedly determine whether the document reading is completed. On the other hand, when it is determined that the specific key 28 has been pressed (S22: YES), the timer is reset and the number of prints is increased by one (i.e. +1), in S23, and the processing returns to S20. Also in this case, an interval from the signal output as a result of the previous pressing of the specific key 28 in S3, S7, S15 or S22 to a signal output as a result of the pressing in S22 is within one second.

When it is determined that the document reading is completed (S20: YES), the print unit 10 starts to print the number of prints stored in the RAM 83 at this time in S24, based on the low resolution image data formed by the image reading of the reading unit 30 from S19 to S20. Continuously, it is determined in S25 whether the printing of the number of prints stored in the RAM 83 at this time is completed (the processing from S24 to S25 is recording processing). When it is determined that the printing is not completed (S25: NO), it is determined in S26 whether one second has elapsed since the timer reset in S13, S16, S23, or S29 as described later, i.e., the last pressing of the specific key 28. When it is determined that one second has elapsed (S26: YES), the number of prints is decided as the number of pressing times of the specific key 28 of two or more (decision processing) in S27, and the processing returns to S25.

When it is determined that one second has not elapsed (S26: NO), it is determined in S28 whether the specific key 28 has been additionally pressed. When it is determined in S28 that the specific key 28 has not been pressed (S28: NO), the processing returns to S25 to repeatedly determine whether the printing is completed. On the other hand, when it is determined that the specific key 28 has been pressed (S28: YES), the timer is reset and the number of prints is increased by one (i.e. +1) in S29, and the processing returns to S25. Also in this case, an interval from the signal output as a result of the previous pressing of the specific key 28 in S3, S7, S15, S22 or S28 to a signal output as a result of the pressing in S28 is within one second.

When it is determined that the printing is completed (S25: YES), the copy operation of multiple copies in the memory copy mode corresponding to the number of pressing times of the specific key 28 is over.

In the present embodiment, the primary preparation operation starts in S2 before the number of prints is fixed in S9. Therefore, when the number of prints is one sheet and is suitable for the primary preparation operation started in S2, it is possible to shorten the time required from the pressing of the specific key 28 in S1 to the printing completion in S11. Also, even when the number of prints is two or more sheets and is not suitable for the primary preparation operation started in S2, the secondary preparation operation starts in S14 before the number of prints is fixed in S27. Therefore, also in this case, it is possible to shorten the time required from the pressing of the specific key 28 in S1 to the printing completion in S25.

Also, in the present embodiment, when it is determined in S3 that the specific key 28 has been pressed (S3: YES), the primary preparation operation is stopped in S12. Since it is possible to start the secondary preparation operation without waiting for the completion of the primary preparation operation, which is unnecessary due to the stop, it is possible to further shorten the time required up to the printing completion (S25: YES) in the case in which the number of prints is not suitable for the primary preparation operation (in the present embodiment, in the case of two or more copies).

Also, in the present embodiment, the specific operation key 28 may be pressed after it is determined in S4 that the primary preparation operation is completed and before the timeout. When it is determined that the primary preparation operation is completed (S4: YES), the reading processing in the high resolution reading mode is immediately started (S6), and the addition of the number of prints as a result of the pressing of the specific operation key 28 is permitted until the timeout (S7: YES, S13). In this way, in the present embodiment, since the reading processing in the high resolution reading mode is started in S6 before it is determined whether the number of prints is one copy or two or more copies, it is possible to shorten the time required up to the printing completion (S11) in the direct copy mode.

Also, in the present embodiment, as can be understood from the above descriptions, the controller 8 decides the number of prints in correspondence to the number of signals counted from the signal first output from the specific key 28 in S1, and the signals is output from the specific key 28 such that the interval between the adjacent signals does not exceed one second (S9, S27). Thereby, it is possible to use one specific key 28 having a simple structure, as the signal output unit.

Even during the executions of the reading processing from S6 to S10 and from S19 to S20 and the recording processing from S24 to S25, when a signal is output from the specific key 28 such that the interval between the adjacent signals does not exceed one second, the number of recording copies is increased. By doing so, the complex machine 1 of the present embodiment is highly convenient for the user.

Also, in the present embodiment, the EEPROM 84 stores, as the selection information of a tray for sheet feeding, that the bypass tray 93 of which the maximum loadable amount of sheets is smaller than the sheet feeding tray 91 is to be used, and the first preparation operation is performed as the primary preparation operation. It is because when a sheet is fed from the bypass tray 93, the number of prints is relatively small in many cases, and the possibility that the number of prints decided by the pressing of the specific key 28 will be suitable for the first preparation operation increases. Therefore, the possibility that it is possible to shorten the time required up to the recording completion further increases.

First Modified Embodiment

Subsequently, a first modified embodiment of the embodiment is described with reference to FIGS. 7A and 7B. In the first modified embodiment, it is presumed that the primary preparation operation and the secondary preparation operation are completed in a time longer than one second (i.e., a predetermined time for fixing the number of copies) from the start of the primary preparation operation and the secondary preparation operation. In descriptions below, differences from the embodiment are described.

Figure 7A:
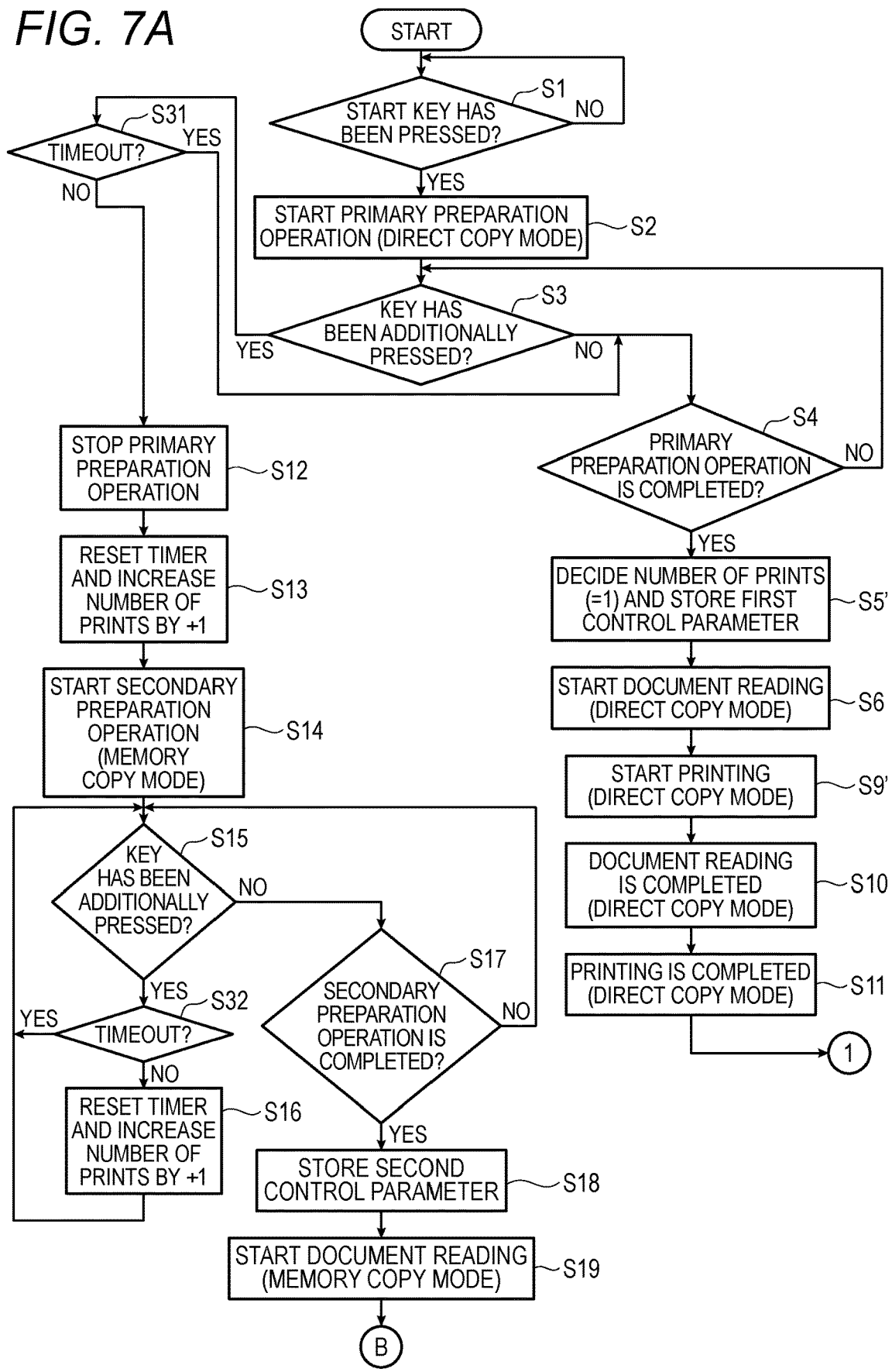
FIGS. 7A and 7B are flowcharts depicting a copy operation of the complex machine in accordance with a first modified embodiment.
Figure 7B:
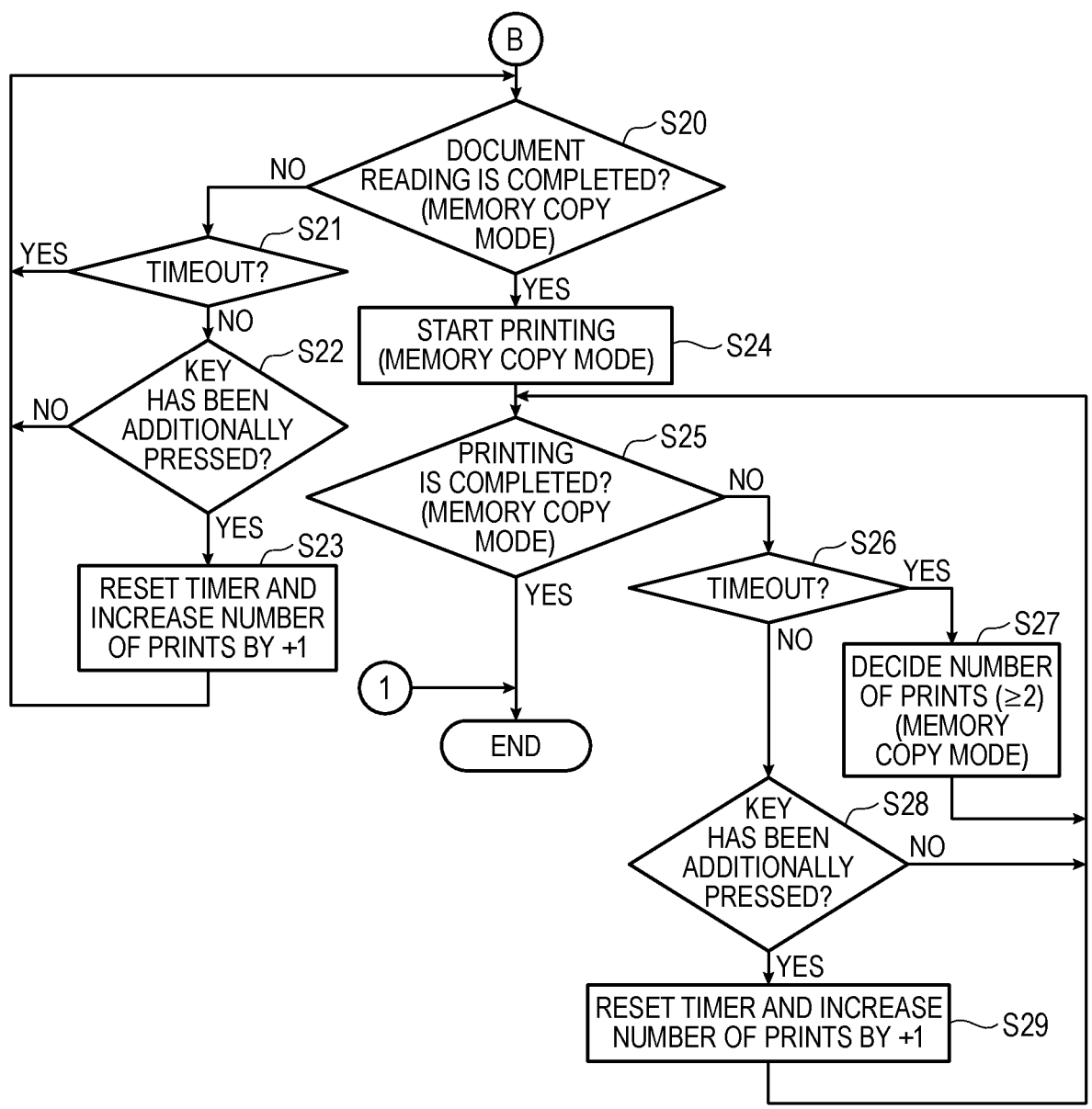

In FIGS. 7A and 7B, when it is determined that the specific key 28 has been additionally pressed before the completion of the primary preparation operation (S3: YES), the processing proceeds to S31. In S31, it is determined whether one second has elapsed since the pressing of the specific key 28 in S1. When it is determined that one second has elapsed (S31: YES), the number of prints is not increased by one (i.e. +1) as a result of the pressing of the specific key 28 and the processing returns to S4 to determine whether the primary preparation operation is completed. When it is determined that the primary preparation operation is completed (S4: YES), the number of prints is determined to be "1" and the number of prints is decided as "1" (determination processing and decision processing), and the first operation parameter acquired by the primary preparation operation is stored in the EEPROM 84 in S5'.

In S6, the reading unit 30 starts reading the document in the high resolution reading mode using the first operation parameter. Then, based on the high resolution image data formed as a result of the image reading by the reading unit 30 started in S6, the print unit 10 starts to print one copy in S9' without executing S7 and S8 described in the above-described embodiment. Thereafter, the similar processing to the above-described embodiment is executed until the printing is completed (S11).

When it is determined that one second has not elapsed (S31: NO), it is determined in S12 that the number of prints is two or more copies (determination processing) and the primary preparation operation started in S2 is stopped. Thereafter, the processing of S13 S14 and S15 and the similar processing to the above-described embodiment are executed, and it is determined in S32 whether one second has elapsed from the timer reset in S13 or S16, i.e., from the last pressing of the specific key 28. When it is determined that one second has elapsed (S32: YES), the processing returns to S15 to repeatedly determine whether the specific key 28 has been pressed. When it is determined that one second has not elapsed (S32: NO), the timer is reset and the number of prints is increased by one (i.e. +1) in S16, and the processing returns to S15 to repeatedly determine whether the specific key 28 has been pressed. Thereafter, the similar processing to the above-described embodiment is executed until the printing is completed (S25: YES).

Also in the first modified embodiment, the primary preparation operation starts in S2 before the number of prints is fixed in S5'. Therefore, when the number of prints is one sheet and is suitable for the primary preparation operation started in S2, it is possible to shorten the time required from the pressing of the specific key 28 in S1 to the printing completion in S11. Also, even when the number of prints is two or more sheets and is not suitable for the primary preparation operation started in S2, the secondary preparation operation starts in S14 before the number of prints is fixed in S27. Therefore, in this case, it is also possible to shorten the time required from the pressing of the specific key 28 in S1 to the printing completion in S25. In addition, it is possible to accomplish some effects described in the above-described embodiment.

Second Modified Embodiment

Figure 8A:
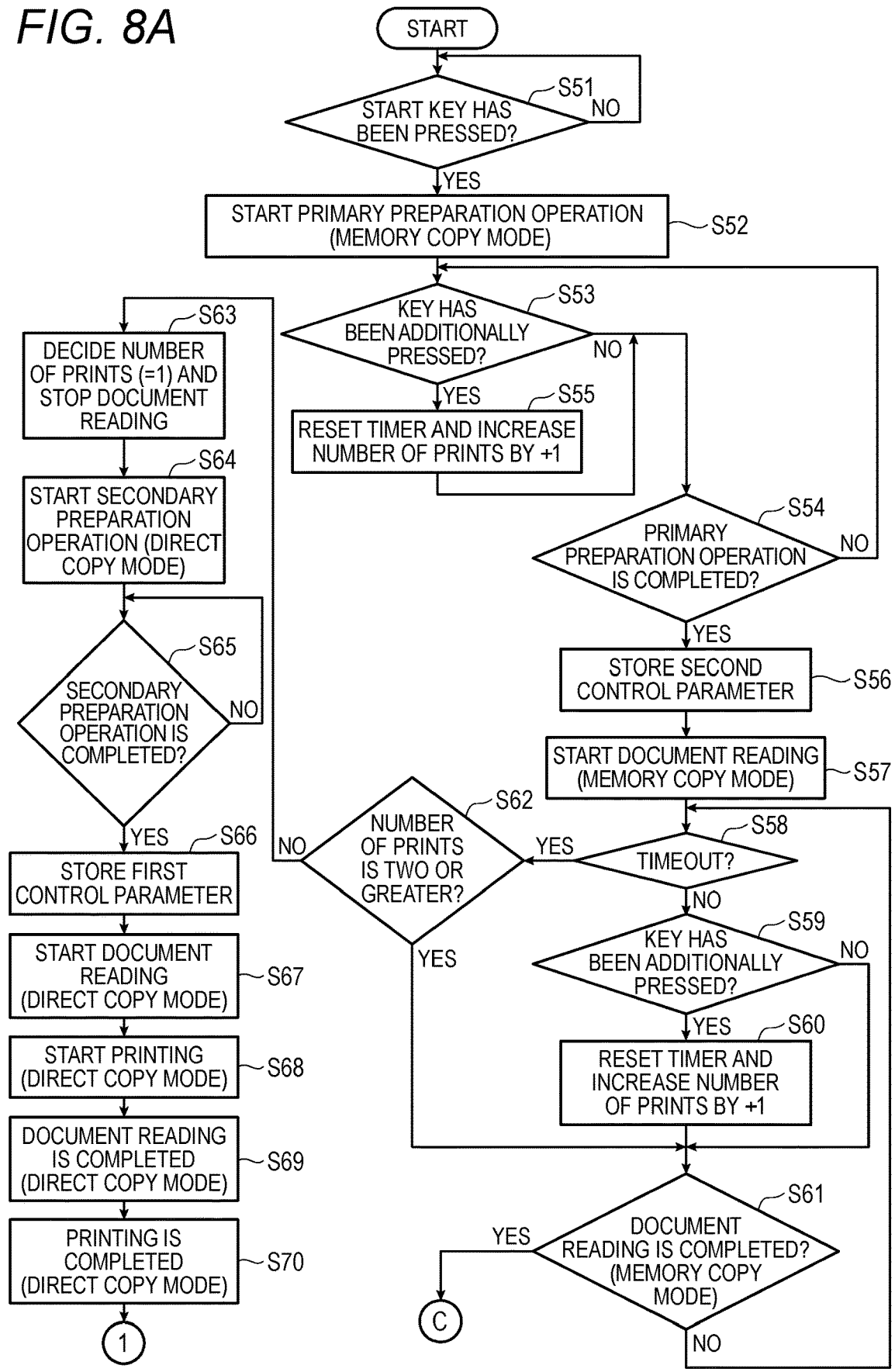
FIGS. 8A and 8B are flowcharts depicting a copy operation of the complex machine in accordance with a second modified embodiment.
Figure 8B:
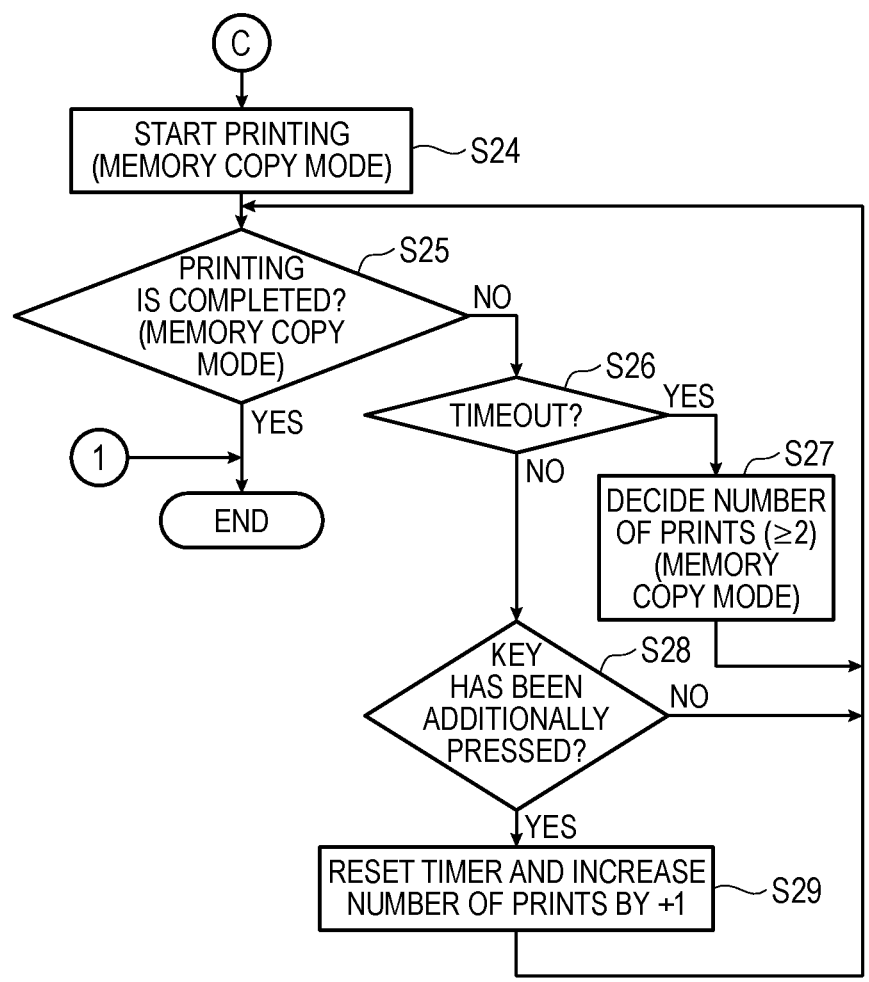

Subsequently, a second modified embodiment of the embodiment is described with reference to FIGS. 8A and 8B. In the second modified embodiment, the second preparation operation is started in the primary preparation operation start processing of the embodiment, and the first preparation operation is started in the secondary preparation operation start processing. Also, in the second modified embodiment, it is presumed that the primary preparation operation and the secondary preparation operation are completed within one second (i.e., a predetermined time for fixing the number of copies) from the starts of the primary preparation operation and the secondary preparation operation, like the above-described embodiment. In descriptions below, differences from the above-described embodiment are described.

First, when it is determined in S51 that the specific key 28 has been pressed (S51: YES), "1" is saved in the RAM 83, as the number of prints, and the processing proceeds to S52. Also, the controller 8 starts to count the timer simultaneously with determining that the specific key 28 has been pressed. In S52, the reading unit 30 starts the primary preparation operation (primary preparation operation start processing). In the second modified embodiment, the primary preparation operation corresponds to the memory copy mode, and is executed so as to acquire the second control parameter for reading the document in the low resolution reading mode.

In the second modified embodiment, the primary preparation operation is set to correspond to the memory copy mode because the EEPROM 84 stores, as the selection information of a tray for sheet feeding, that the sheet feeding tray 91 of which the maximum loadable amount of sheets is greater than the bypass tray 93 is to be used.

It is determined whether the specific key 28 has been additionally pressed since the start of the primary preparation operation in S52 (S53). When it is determined that the specific key has not been additionally pressed (S53: NO), it is determined whether the primary preparation operation is completed (S54). When it is determined that the primary preparation operation is not completed (S54: NO), the processing returns to S53. When it is determined in S53 that the specific key 28 has been pressed (S53: YES), the timer is reset and the number of prints is increased by one (i.e. +1) in S55, and the processing proceeds to S54. When it is determined that the primary preparation operation is completed (S54: YES), the second operation parameter acquired by the primary preparation operation is stored in the EEPROM 84 (S56).

In S57, the reading unit 30 starts reading the document in the low resolution reading mode using the second operation parameter. The image data generated by the reading is saved in the RAM 83. In the second modified embodiment, the time necessary for the document reading is longer than one second in both modes of the direct copy mode and the memory copy mode. In S58, it is determined whether one second has elapsed from the pressing of the specific key 28 in S51 or S53 (timeout). When it is determined that one second has not elapsed (S58: NO), it is determined in S59 whether the specific key 28 has been pressed. When it is determined that the specific key 28 has not been pressed (S59: NO), the processing proceeds to S61.

Also, when it is determined that the specific key 28 has been pressed (S59: YES), the timer is reset and the number of prints is increased by one (i.e. +1) in S60, and the processing proceeds to S61. In S61, it is determined whether the document reading is completed (the processing from S57 to S61 is reading processing). When it is determined that the document reading is not completed (S61: NO), the processing returns to S58 to repeatedly determine whether one second has elapsed.

When it is determined that one second has elapsed (S58: YES), it is determined in S62 (determination processing) whether the number of prints is saved as two or greater, i.e., the specific key 28 has been pressed two or more times until the timeout. When it is determined that the number of prints is two or greater (S62: YES), the processing proceeds to S61, and when the number of prints is one (S62: NO), the processing proceeds to S63. In S63, the number of prints is decided as "1" (decision processing), and the document reading started in S57 is stopped. In the meantime, in the case in which the processing proceeds from S62 to S63, it is not regarded that the reading processing has been executed in the present disclosure, because the reading processing started in S57 has not been completed.

On the other hand, when it is determined in S61 that the document reading is completed (S61: YES), the processing proceeds to S24. Since the processing of S24 and thereafter is the same as the above-described embodiment until it is determined in S25 that the printing is completed, the descriptions thereof are omitted.

In S64, the reading unit 30 starts the secondary preparation operation (secondary preparation operation start processing). In the second modified embodiment, the secondary preparation operation corresponds to the direct copy mode, and is executed so as to acquire the first control parameter for reading the document in the high resolution reading mode. Continuously, it is determined whether the secondary preparation operation is completed (S65). When it is determined that the secondary preparation operation is completed (S65: YES), the processing proceeds to S66, and the first operation parameter acquired by the secondary preparation operation is stored in the EEPROM 84 (S66).

Then, in S67, the reading unit 30 starts reading the document in the high resolution reading mode using the first operation parameter. The image data generated by the reading is saved in the RAM 83. Continuously, based on the high resolution image data formed by the image reading of the reading unit 30 started in S67, the print unit 10 starts to print one copy in S68. At this time, the image is being continuously read by the reading unit 30. Also, the image data saved in the RAM 83 is deleted in order of the image data of which printing has been completed.

After the document reading is completed in S69 (the processing from S67 to S69 is reading processing), the printing of one copy is completed in S69 (the processing from S68 to S70 is recording processing), so that the copy operation in the memory copy mode is over.

In the second modified embodiment, the primary preparation operation starts in S2 before the number of prints is fixed in S27. Therefore, when the number of prints is two or more sheets and is suitable for the primary preparation operation started in S2, it is possible to shorten the time required from the pressing of the specific key 28 in S1 to the printing completion in S25. In the second modified embodiment, when the number of prints is one sheet and is not suitable for the primary preparation operation started in S2, the secondary preparation operation starts in S64 substantially simultaneously with the fixing of the number of prints in S63. Therefore, the time necessary for the printing completion is not lengthened, as compared to the related art. In addition, it is possible to accomplish some effects described in the above-described embodiment.

Other Modified Embodiments

In addition, the embodiment can be changed as follows.

Whether to execute the first or second preparation operation when the specific key 28 is pressed can be determined according to the setting information other than the selection information of a tray for sheet feeding.

Whether to execute the first or second preparation operation when the specific key 28 is pressed can be determined according to factors other than the setting information. For example, the first preparation operation may be executed all the time.

In FIGS. 6A, 6B and 8A, 8B, instead of the configuration in which the document reading starts in S6 and S57 without waiting for the timeout after the completion of the primary preparation operation in S4 and S54, the document reading may start after the timeout.

The determination processing and the decision processing may be executed based on a signal pattern output from the specific key 28 such as a pressing duration of the specific key 28.

In the present disclosure, a signal output unit other than the operation key 28 may be used. For example, the signal output unit may be the ten-key board or the touch panel. That is, any signal output unit, which can determine whether the number of recording copies is smaller than a predetermined number of copies or equal to or greater than the predetermined number of copies, based on the output signal pattern, and which can determine the continuous number of recording copies, can be used.

In the first modified embodiment (FIGS. 7A and 7B), the second preparation operation may start in the primary preparation operation start processing and the first preparation operation may start in the secondary preparation operation start processing.

The complex machine 1 in accordance with the embodiment includes the EEPROM and the RAM but may include either the EEPROM or the RAM.

The primary preparation operation may be continuously executed without stopping the primary preparation operation in S12.

The addition of the number of copies may not be received during the reading processing and the recording processing.

The control parameter acquired by the preparation operation may include a parameter other than the parameters described in the above-described embodiment.

In the embodiment, the complex machine including the inkjet-type image recording unit configured to record an image by the ink discharged from the nozzles has been exemplified. However, the present disclosure can also be applied to an image forming apparatus including a laser-type recording unit other than the inkjet type, for example.

What is claimed is:

1. An image forming apparatus comprising:
   a signal output unit configured to output a signal in response to a user operation;
   a reading unit configured to read a document and generate image data having a first resolution or a second resolution lower than the first resolution;
   a recording unit configured to form an image on a recording medium; and
   a controller configured to control the reading unit and the recording unit,
   wherein the controller is configured to execute:
   (a) primary preparation operation start processing of, when the signal is output from the signal output unit, controlling the reading unit so as to start:
      a first preparation operation of acquiring a first control parameter used for reading the document in a high resolution reading mode corresponding to the first resolution; or
      a second preparation operation of acquiring a second control parameter used for reading the document in a low resolution reading mode corresponding to the second resolution,
   (b) determination processing of determining whether a continuous number of recording copies to be performed by the recording unit is smaller than a predetermined number of copies or equal to or greater than the predetermined number of copies, based on a signal pattern output from the signal output unit, after the first preparation operation or the second preparation operation is started in the primary preparation operation start processing;
   any one of processing of following (c1) to (c4):
      (c1) reading processing of causing the reading unit to read the document in the high resolution reading mode in which the first control parameter acquired by the first preparation operation is used and generating the image data, in a case where the first preparation operation is started in the primary preparation operation start processing and the number of recording copies is determined to be smaller than the predetermined number of copies in the determination processing;
      (c2) secondary preparation operation start processing of controlling the reading unit so as to start the second preparation operation, and reading processing of causing the reading unit to read the document in the low resolution reading mode in which the second control parameter acquired by the second preparation operation is used and generating the image data, in a case where the first preparation operation is started in the primary preparation operation start processing and the number of recording copies is determined to be equal to or greater than the predetermined number of copies in the determination processing;
- (c3) reading processing of causing the reading unit to read the document in the low resolution reading mode in which the second control parameter acquired by the second preparation operation is used and generating the image data, in a case where the second preparation operation is started in the primary preparation operation start processing and the number of recording copies is determined to be equal to or greater than the predetermined number of copies in the determination processing; and
- (c4) secondary preparation operation start processing of controlling the reading unit so as to start the first preparation operation, and reading processing of causing the reading unit to read the document in the high resolution reading mode in which the first control parameter acquired by the first preparation operation is used and generating the image data, in a case where the second preparation operation is started in the primary preparation operation start processing and the number of recording copies is determined to be smaller than the predetermined number of copies in the determination processing,
- (d) decision processing of deciding the continuous number of recording copies to be performed by the recording unit, based on the signal pattern output from the signal output unit; and
- (e) recording processing of causing the recording unit to form the image on the recording medium of which the number of recording copies is decided in the decision processing, based on the image data generated in the reading processing.

2. The image forming apparatus according to claim 1, wherein, in the secondary preparation operation start processing of (c2), when the first preparation operation is not completed in the case where the first preparation operation is started in the primary preparation operation start processing and the number of recording copies is determined to be equal to or greater than the predetermined number of copies in the determination processing, the controller controls the reading unit so as to start the second preparation operation after stopping the first preparation operation, and
wherein, in the secondary preparation operation start processing of (c4), when the second preparation operation is not completed in the case where the second preparation operation is started in the primary preparation operation start processing and the number of recording copies is determined to be smaller than the predetermined number of copies in the determination processing, the controller controls the reading unit so as to start the first preparation operation after stopping the second preparation operation.

3. The image forming apparatus according to claim 1, wherein, in the decision processing, the controller is configured to decide the number of recording copies in correspondence to a number of signals counted from a signal first output from the signal output unit, the signals being output from the signal output unit such that an interval between adjacent signals does not exceed a predetermined time.

4. The image forming apparatus according to claim 3, wherein, in the decision processing, in a case where a signal is output from the signal output unit such that the interval between adjacent signals does not exceed the predetermined time, the controller increases the number of recording copies even while the reading processing of (c2) or (c4) and the recording processing executed after the reading processing of (c2) or (c4) are executed.

5. The image forming apparatus according to claim 1, further comprising:
a setting information storage configured to store setting information that is settable by a user with respect to an operation of the image forming apparatus,
wherein, in the primary preparation operation start processing, the controller is configured to control the reading unit so as to start the first preparation operation or the second preparation operation in correspondence to the setting information stored in the setting information storage.

6. The image forming apparatus according to claim 5, further comprising:
a plurality of sheet feeding units configured to feed the recording medium to the recording unit,
wherein, in the primary preparation operation start processing, in a case where the setting information storage stores, as the setting information, that any one, of which a maximum loadable amount of the recording medium is smallest, of the plurality of sheet feeding units is to be used, the controller controls the reading unit so as to start the first preparation operation.

7. The image forming apparatus according to claim 1, wherein the first control parameter acquired by the first preparation operation and the second control parameter acquired by the second preparation operation each includes at least one of a current value to be supplied to a light source in the reading unit, a reference voltage of an AD convener, and a monochrome density correction parameter.

8. The image forming apparatus according to claim 1, wherein in a case where the determination processing is not executed until the first preparation operation or the second preparation operation started in the primary preparation operation start processing is completed, the controller controls the reading unit so as to start the reading processing of (c1) or (c3) without waiting for execution of the determination processing, and then, in a case where a determination different from the determination defined in (c1) or (c3) is made in the determination processing, the controller controls the reading unit so as to start the secondary preparation operation start processing and the reading processing of (c2) or (c4), respectively.

\* \* \* \* \*